US007986956B2

(12) United States Patent
Bridge et al.

(10) Patent No.: US 7,986,956 B2
(45) Date of Patent: Jul. 26, 2011

(54) SUPPORTING MOBILE VOICE CLIENTS IN A WLAN

(75) Inventors: Laura Bridge, Sharon, NH (US); Floyd Backes, Sharon, NH (US); Roger Durand, Amherst, NH (US); David Hill, Holden, MA (US)

(73) Assignee: Autocell Laboratories, Inc., Acton, MA (US)

( * ) Notice: Subject to any disclaimer, the term of this patent is extended or adjusted under 35 U.S.C. 154(b) by 1297 days.

(21) Appl. No.: 11/551,412

(22) Filed: Oct. 20, 2006

(65) Prior Publication Data

US 2007/0116034 A1  May 24, 2007

Related U.S. Application Data

(60) Provisional application No. 60/729,343, filed on Oct. 21, 2005.

(51) Int. Cl.
*H04B 7/00* (2006.01)
(52) U.S. Cl. ............ 455/522; 455/13.4; 455/69; 455/70; 455/507; 455/436; 455/422.1; 370/318; 370/328; 370/331; 370/448
(58) Field of Classification Search .................. 455/522, 455/11.1, 13.4, 41.2, 63.1, 67.11, 69, 70, 455/115.1, 127.1, 343.1, 504, 507, 450, 432.1, 455/436, 439, 442, 422.1; 370/318, 328, 331, 336, 448; 375/295, 345; 385/140
See application file for complete search history.

(56) References Cited

U.S. PATENT DOCUMENTS

| 7,058,400 | B2 * | 6/2006 | Brooks ...................... 455/424 |
| 2004/0002352 | A1 * | 1/2004 | Sendonaris ................. 455/522 |
| 2004/0203688 | A1 * | 10/2004 | Backes et al. ............... 455/418 |
| 2006/0153106 | A1 * | 7/2006 | Laakso et al. ............... 370/282 |

* cited by examiner

*Primary Examiner* — Shaima Q Aminzay
(74) *Attorney, Agent, or Firm* — Anderson Gorecki & Manaras LLP

(57) ABSTRACT

Operation of a mobile voice client utilizing a WLAN for access is enhanced by controlling the rate at which transmission power is changed by the access point with which the mobile voice client is associated. The access point calculates a target transmit power level based at least in-part on the distance to the nearest fixed position wireless device and the distance to the mobile voice client. The access point then determines whether the target transmit power level differs from a current transmit power level. If the target transmit power level is greater than the current transmit power level, the current transmit power level is increased at a first controlled, non-instantaneous rate such as 1 dB per second. If the target transmit power level is less than the current transmit power level, the current transmit power level is decreased at a second controlled, non-instantaneous rate such as 1 dB per second.

18 Claims, 4 Drawing Sheets

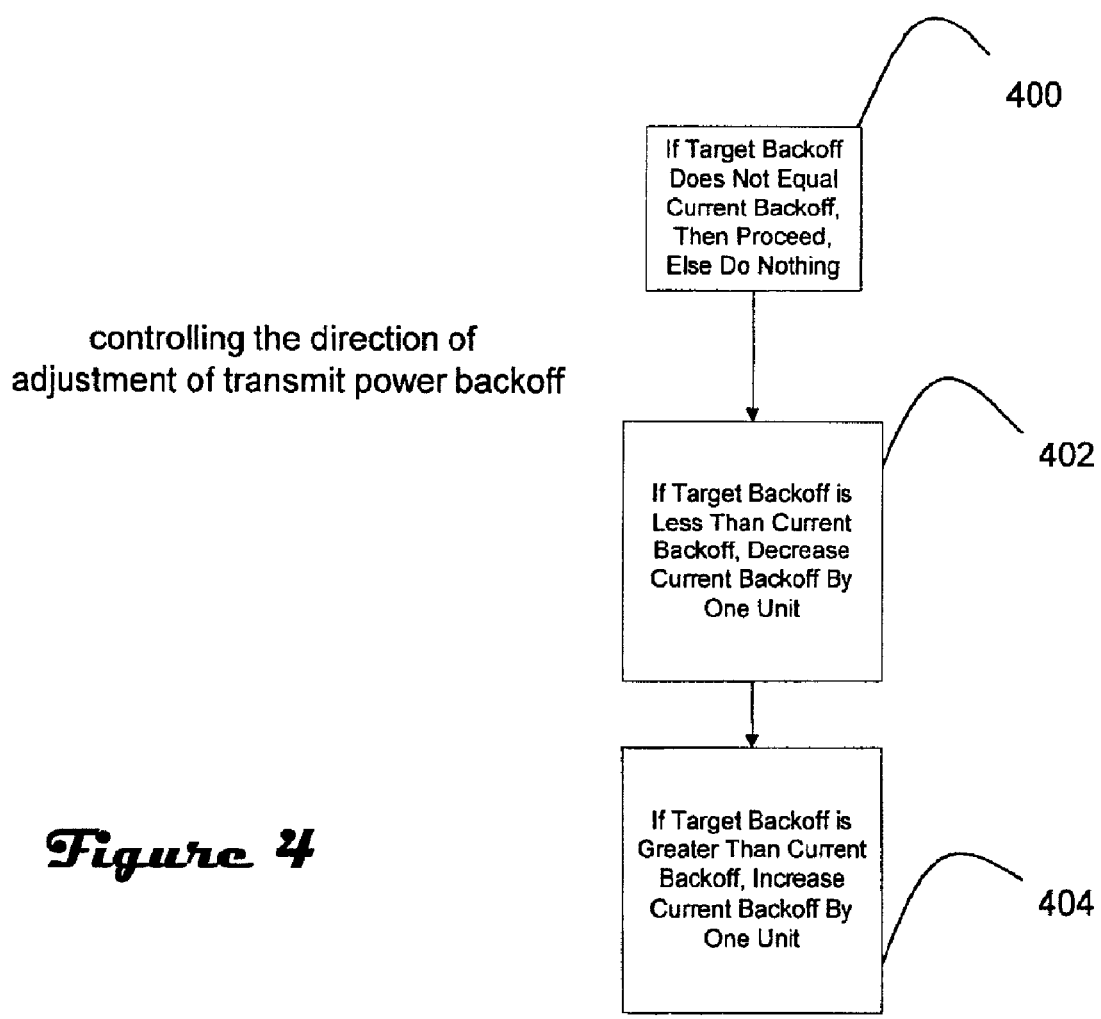

SUPPORTING MOBILE VOICE CLIENTS IN A WLAN

CROSS-REFERENCE TO RELATED APPLICATIONS

A claim of priority is made to U.S. Provisional Patent Application 60/729,343, filed Oct. 21, 2005, entitled CHANGES TO AUTOCELL AUTOMATIC TPC TO SUPPORT MOBILE VOICE CLIENTS, which is incorporated by reference. This application may be related to co-pending U.S. patent application Ser. No. 10/781,474, filed Feb. 18, 2004, entitled METHOD FOR ADJUSTING CHANNEL INTERFERENCE BETWEEN ACCESS POINTS IN A WIRELESS NETWORK, which is incorporated by reference.

FIELD OF THE INVENTION

This invention relates generally to the field of wireless communications, and more particularly to WLAN support of mobile voice clients.

BACKGROUND OF THE INVENTION

Techniques for providing automatic channel selection transmit power control ("TPC") and load balancing in a WLAN environment are known. Each of these techniques enhances WLAN performance. Adjusting TPC, for example, mitigates interference caused by access points ("APs") operating on the same channel. In particular, either or both APs operating on a given channel reduce their transmission power to reduce overlap to a desired level. However, TPC can compromise voice quality in some instances where mobile voice clients utilize APs for access.

BRIEF DESCRIPTION OF THE FIGURES

FIG. 4 illustrates a technique for controlling the direction of adjustment of transmit power backoff.

DETAILED DESCRIPTION

Figure 1:
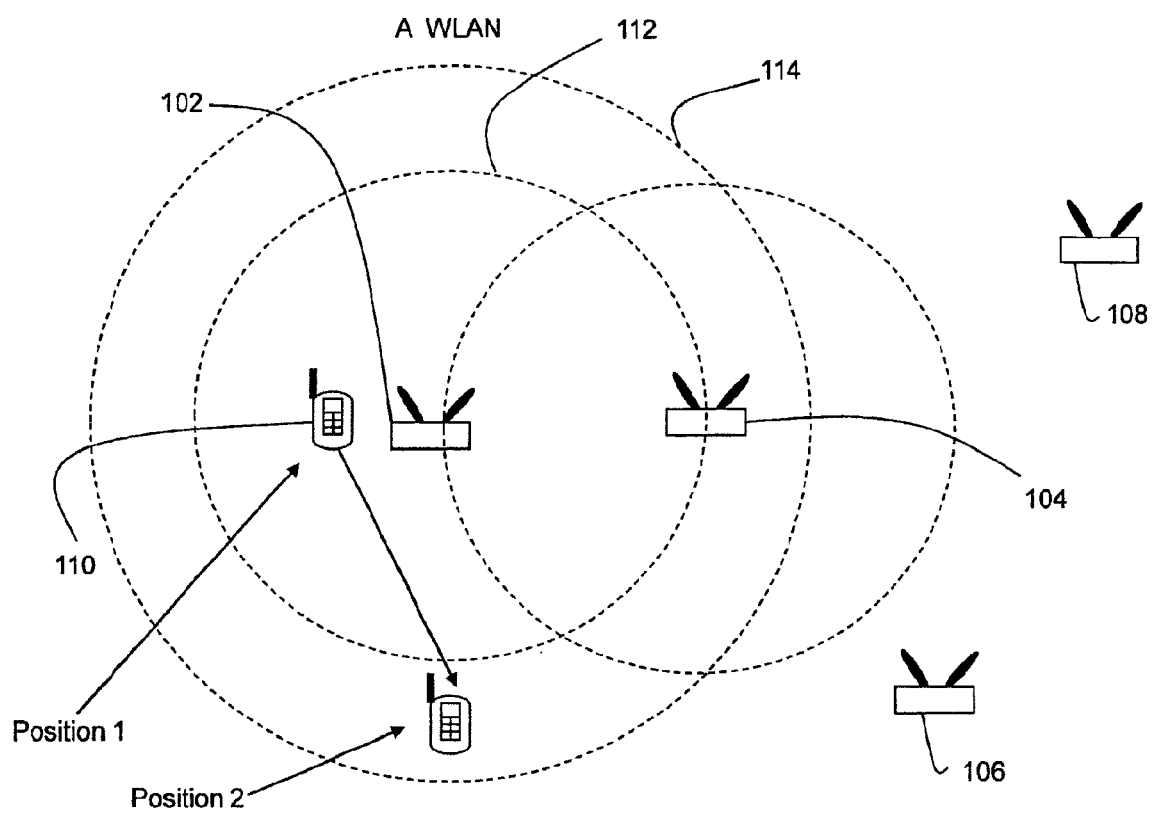
FIG. 1 illustrates a WLAN.

Referring to FIG. 1, the invention will be described in the context of a WLAN access point ("AP") (102) having three other APs (104, 106, 108) operating on the same channel. A mobile voice client (110), which is associated with access point (102), is in motion at least some of the time. Access point (102) is capable of adjusting transmit power and tracking the position of stations such as mobile voice client (110) in order to enhance performance. Power adjustment is described in U.S. patent application Ser. No. 10/781,474, filed Feb. 18, 2004, entitled METHOD FOR ADJUSTING CHANNEL INTERFERENCE BETWEEN ACCESS POINTS IN A WIRELESS NETWORK which is incorporated herein by reference. Station movement, as described in US 2004/0166851 A1 [0167], which is also incorporated by reference, 2.a.1.3.i, is distinct from station position, and need not necessarily be measured.

In accordance with one embodiment of the invention, the access point (102) is equipped with circuitry including at least one processor and memory for executing the steps described below such that when a determination is made to adjust access point (102) transmit power the power adjustment is made gradually. For example, power level changes may be limited to 1 dB every X seconds, where X is a configurable parameter that represents the power control "aggressiveness," i.e., short values of X would be very aggressive, while large values of X would be considered least aggressive. When there is at least one station associated with the access point (102) and the signal strength of the weakest associated station is weaker than that of the nearest AP (104) on the same channel, then power is slowly increased to a target value that would reach the farthest station at 10 dB above the noise floor. As a result, if the station is moving towards another AP (104), then the station will roam on its own before the AP (102) needs to raise its power.

Figure 2:
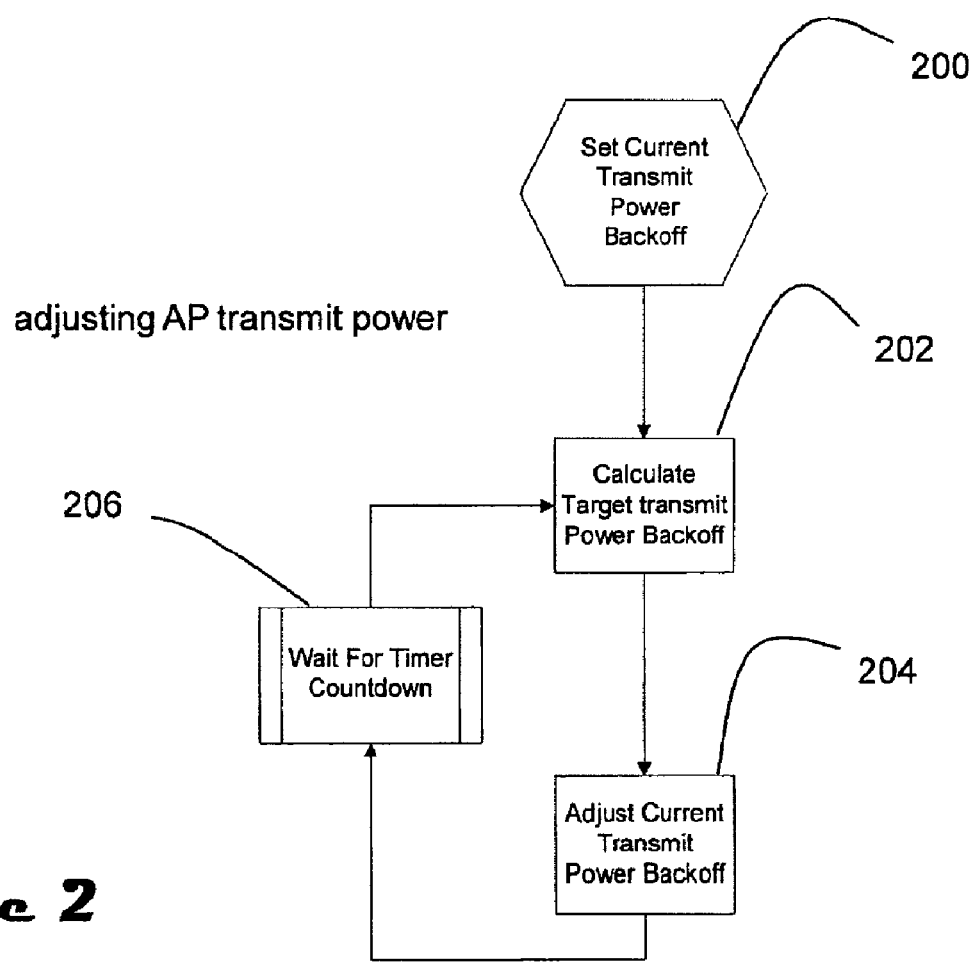
FIG. 2 illustrates a technique for adjusting AP transmit power in a manner which facilitates operation of a mobile voice client.

Referring now to FIGS. 1 and 2, when access point (102) is initialized it sets its current transmit power backoff to a predetermined value as shown in step (200), e.g., to 0, unless a minimum backoff has been configured for the AP. Transmit power backoff is a variable that is indicative of attenuation of transmit power level, which can be represented in terms of decibels. This backoff is applied to transmissions of both management and data frames. When no stations are associated, the transmit power is set to a level that would reach the nearest AP on the same channel at 10 dB above the noise floor. The access point power control algorithm then operates in a loop in which a target transmit power backoff is calculated, as shown in step (202), following which current transmit power backoff is adjusted toward the calculated target (if different), as shown in step (204). Flow then returns to step (202). Return to step (202) is delayed until the expiration of a timer as shown by step (206). For example, the change in current backoff may be limited to one unit per second by setting the timer appropriately, e.g., 1 dB per second.

Figure 3:
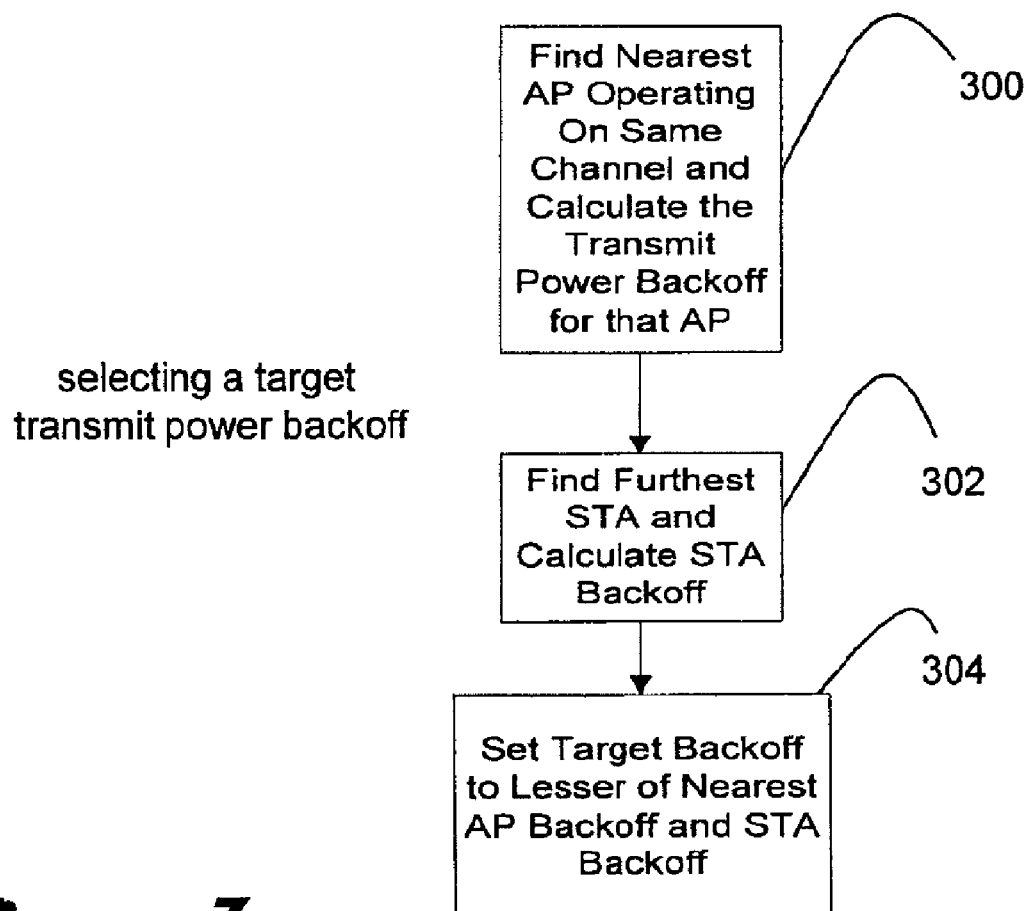
FIG. 3 illustrates a technique for selecting a target transmit power backoff.

Referring to FIGS. 1 and 3, calculation of target transmit power backoff (step 202, FIG. 2) will be described in greater detail. In the first step (300) of this process, the access point (102) which is executing the technique calculates which, if any, access point is the nearest access point operating on the same channel, and calculates the transmit power backoff needed to reach that AP at 10 dB. In the illustrated example access point (104) is the nearest access point to access point (102). The proximity of access points operating on the same channel can be determined as a function of maximum transmit power, received power level (at the access point executing the technique), and transmit power backoff advertised by the nearby access points. However, other techniques may also be employed. In step (302) the access point (102) calculates which station associated with access point (102) is furthest away, and calculates the transmit power backoff needed to reach that station at 10 dB. In the illustrated example mobile voice client (110) is the further station associated with access point (102). The proximity of stations associated with the access point can be determined as a function of maximum transmit power, received power level (at the access point executing the technique), and transmit power backoff, but other techniques could alternatively be employed. The access point (102) then sets its target transmit power backoff to the lesser of the backoff for the nearest access point and the transmit power backoff for the furthest station associated with the access point.

Referring to FIGS. 1 and 4, adjustment of transmit power backoff (202, FIG. 2), and hence adjustment of transmit power, will be described in greater detail. The triggering condition is when the target backoff does not equal the current backoff, as shown in step (400). When this condition is met, if the target backoff is less than current backoff then the current backoff is decreased by one unit, e.g., one dB, as shown in step (402). If the target backoff is greater than the current backoff then the current backoff is increased by one unit, e.g., one dB, as shown in step (404). This adjustment to transmit power applies to the transmission of both management and data frames.

Referring now to FIG. 1, at time $t_0$ access point (102) will initially set its current backoff to correspond with a transmission range (112). The transmission range (112) is selected because it corresponds to the distance to the nearest access point (104) operating on the same channel. At a subsequent time $t_1$, mobile voice client (110) becomes associated with access point (102) at position 1. Under these conditions the target backoff is set to the nearest access point backoff in accordance with step (304, FIG. 3). At a subsequent time $t_2$, mobile voice client (110) moves toward position 2. At some point between position 1 and position 2 the backoff for the mobile voice client will be less than the backoff for access point (104), so the target backoff of access point (102) is set to the STA (mobile voice client) backoff in accordance with step (304, FIG. 3), i.e., a value corresponding to transmission range (114). However, the rate of change is governed by the timer such that a change of dB would be executed in 1 dB increments over the course of five seconds (1 dB per second). If the mobile voice client moves closer to access point (102), whether or not transmission range (114) has been reached, and the backoff of the access point (104) is again greater than that of the mobile voice client, then the transmission power of access point will be adjusted toward transmission range (112) at a rate of 1 dB per second. Such damping of the rate of change in transmission power improves operation of the mobile voice client.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method executed by a first fixed position wireless device for supporting operation of a mobile voice client in a network in which the mobile voice client accesses the network via one of a plurality of fixed position wireless devices, comprising the steps of:
    calculating a target transmit power backoff based at least in-part on distance to a nearest fixed position wireless device and distance to the mobile voice client;
    determining whether the target transmit power backoff differs from a current transmit power backoff;
    when the target transmit power backoff is greater than the current transmit power backoff, decreasing current transmit power level at a first controlled, non-instantaneous rate; and
    when the target transmit power backoff is less than the current transmit power backoff, increasing the current transmit power level at a second controlled, non-instantaneous rate.

2. The method of claim 1 wherein the first controlled, non-instantaneous rate is one dB per every X seconds, where X is a configurable parameter.

3. The method of claim 1 wherein the second controlled, non-instantaneous rate is one dB per every X seconds, where X is a configurable parameter.

4. The method of claim 1 wherein the first controlled, non-instantaneous rate is X dB per second, where X is a configurable parameter.

5. The method of claim 1 wherein the second controlled, non-instantaneous rate is X dB per second, where X is a configurable parameter.

6. The method of claim 1 including the further step of calculating the target transmit power backoff such that the mobile voice client will receive transmissions at a predetermined level above a noise floor.

7. The method of claim 6 including the further step of identifying the nearest fixed position wireless device operating on the same channel.

8. The method of claim 7 identifying the identifying the furthest mobile device associated with the first fixed position wireless device.

9. The method of claim 8 including the further step of setting target backoff to the lesser of nearest fixed position wireless device backoff and furthest associated mobile device backoff.

10. A first fixed position wireless device for supporting operation of a mobile voice client in a network in which the mobile voice client accesses the network via one of a plurality of fixed position wireless devices, comprising:
    circuitry operable to calculate a target transmit power backoff based at least in-part on distance to a nearest fixed position wireless device and distance to the mobile voice client, and to determine whether the target transmit power backoff differs from a current transmit power backoff, and when the target transmit power backoff is greater than the current transmit power backoff, decreasing the current transmit power level at a first controlled, non-instantaneous rate, and when the target transmit power backoff is less than the current transmit power backoff, increasing the current transmit power level at a second controlled, non-instantaneous rate.

11. The apparatus of claim 10 wherein the first controlled, non-instantaneous rate is one dB per every X seconds, where X is a configurable parameter.

12. The apparatus of claim 10 wherein the second controlled, non-instantaneous rate is one dB per every X seconds, where X is a configurable parameter.

13. The apparatus of claim 10 wherein the first controlled, non-instantaneous rate is X dB per second, where X is a configurable parameter.

14. The apparatus of claim 10 wherein the second controlled, non-instantaneous rate is X dB per second, where X is a configurable parameter.

15. The apparatus of claim 10 further including circuitry operable to calculate the target transmit power backoff such that the mobile voice client will receive transmissions at a predetermined level above a noise floor.

16. The apparatus of claim 15 further including circuitry operable to identify the nearest fixed position wireless device operating on the same channel.

17. The apparatus of claim 16 further including circuitry operable to identify the furthest mobile device associated with the first fixed position wireless device.

18. The apparatus of claim 17 further including circuitry operable to set target backoff to the lesser of nearest fixed position wireless device backoff and furthest associated mobile device backoff.

* * * * *